United States Patent
Jaenisch et al.

(10) Patent No.: US 11,321,462 B2
(45) Date of Patent: May 3, 2022

(54) DEVICE BEHAVIOR ANOMALY DETECTION

(71) Applicant: Raytheon Company, Waltham, MA (US)

(72) Inventors: Holger M. Jaenisch, Toney, AL (US); James W. Handley, Toney, AL (US); Tonja L. Rogers, Newburyport, MA (US)

(73) Assignee: Raytheon Company, Waltham, MA (US)

( * ) Notice: Subject to any disclaimer, the term of this patent is extended or adjusted under 35 U.S.C. 154(b) by 558 days.

(21) Appl. No.: 16/265,526

(22) Filed: Feb. 1, 2019

(65) Prior Publication Data
US 2019/0311120 A1    Oct. 10, 2019

Related U.S. Application Data

(60) Provisional application No. 62/655,564, filed on Apr. 10, 2018.

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC .. G06F 21/566; H04L 63/1425; G06N 99/005
See application file for complete search history.

(56) References Cited

U.S. PATENT DOCUMENTS

| | | |
|---|---|---|
| 6,760,032 B1 | 7/2004 | James |
| 7,036,016 B1 | 4/2006 | Smith, Jr. |
| 8,301,387 B2 | 10/2012 | Hwa et al. |
| 8,839,417 B1 | 9/2014 | Jordan |
| 9,245,116 B2 | 1/2016 | Evans et al. |
| 10,076,273 B2 | 9/2018 | Berckmans et al. |
| 10,110,629 B1 | 10/2018 | Kruse et al. |

(Continued)

FOREIGN PATENT DOCUMENTS

| | | |
|---|---|---|
| EP | 2942919 A1 | 11/2015 |
| WO | WO-2019199675 A1 | 10/2019 |

(Continued)

OTHER PUBLICATIONS

"U.S. Appl. No. 16/281,888, Non Final Office Action dated May 19, 2020", 15 pgs.

(Continued)

*Primary Examiner* — Meng Li
*Assistant Examiner* — Shu Chun Gao
(74) *Attorney, Agent, or Firm* — Schwegman Lundberg & Woessner, P.A.

(57) ABSTRACT

A method of identifying anomalous behavior can include transforming input data to a series of numbers, determining first features and second features of the series of numbers that, given the same numbers in a different order, produce a different value for the respective feature, encoding the series of numbers by a key value indicating a number associated with a cell of a grid of cells to which the first and second features map, and determining, based on whether the key value has been previously provided, whether the input is anomalous.

20 Claims, 7 Drawing Sheets

(56) References Cited

U.S. PATENT DOCUMENTS

| | | | |
|---|---|---|---|
| 10,326,796 | B1 | 6/2019 | Varad et al. |
| 10,507,973 | B2 | 12/2019 | Park |
| 10,521,584 | B1 | 12/2019 | Sharifi Mehr |
| 10,929,722 | B2 | 2/2021 | Cheng et al. |
| 10,937,465 | B2 | 3/2021 | Jaenisch et al. |
| 11,036,858 | B2 | 6/2021 | Chistyakov et al. |
| 11,132,923 | B2 | 9/2021 | Jaenisch et al. |
| 2003/0084349 | A1 | 5/2003 | Friedrichs et al. |
| 2003/0174895 | A1 | 9/2003 | Hsieh |
| 2006/0009956 | A1 | 1/2006 | Winckel et al. |
| 2006/0101516 | A1 | 5/2006 | Sudaharan et al. |
| 2007/0245119 | A1 | 10/2007 | Hoppe |
| 2009/0241006 | A1 | 9/2009 | Liikanen et al. |
| 2010/0064370 | A1 | 3/2010 | Chamley et al. |
| 2011/0238855 | A1* | 9/2011 | Korsunsky ............ G06F 21/56 709/231 |
| 2012/0240185 | A1* | 9/2012 | Kapoor .................. H04L 63/20 726/1 |
| 2013/0145465 | A1 | 6/2013 | Wang et al. |
| 2015/0026582 | A1 | 1/2015 | Basak |
| 2015/0100556 | A1 | 4/2015 | Sekiguchi et al. |
| 2015/0131796 | A1 | 5/2015 | Milsted |
| 2015/0154796 | A1 | 6/2015 | Co |
| 2015/0206315 | A1 | 7/2015 | Price et al. |
| 2015/0295907 | A1 | 10/2015 | Abrahamson |
| 2016/0321323 | A1 | 11/2016 | Gaumnitz et al. |
| 2016/0359685 | A1 | 12/2016 | Yadav et al. |
| 2016/0359886 | A1 | 12/2016 | Yadav et al. |
| 2017/0149787 | A1 | 5/2017 | Niemela et al. |
| 2017/0257396 | A1 | 9/2017 | Shen et al. |
| 2017/0302691 | A1 | 10/2017 | Singh et al. |
| 2017/0310690 | A1* | 10/2017 | Mestha ................. G06N 20/00 |
| 2017/0327890 | A1 | 11/2017 | Saint-andre et al. |
| 2018/0027004 | A1 | 1/2018 | Huang et al. |
| 2018/0085011 | A1 | 3/2018 | Ma et al. |
| 2018/0160905 | A1 | 6/2018 | Wang et al. |
| 2018/0204111 | A1 | 7/2018 | Zadeh et al. |
| 2018/0337935 | A1 | 11/2018 | Marwah et al. |
| 2019/0018375 | A1 | 1/2019 | Deshpande et al. |
| 2019/0149565 | A1 | 5/2019 | Hagi et al. |
| 2019/0180181 | A1 | 6/2019 | Lilley |
| 2019/0196746 | A1 | 6/2019 | Fujimoto et al. |
| 2019/0279112 | A1 | 9/2019 | Jaenisch et al. |
| 2019/0289034 | A1 | 9/2019 | Erez et al. |
| 2019/0296913 | A1 | 9/2019 | Verma et al. |
| 2019/0312908 | A1 | 10/2019 | Jaenisch et al. |
| 2019/0383874 | A1 | 12/2019 | Jaenisch et al. |
| 2020/0202749 | A1 | 6/2020 | Jaenisch et al. |
| 2020/0204574 | A1* | 6/2020 | Christian ............. G06K 9/6218 |
| 2020/0272731 | A1 | 8/2020 | Jaenisch et al. |
| 2020/0273499 | A1 | 8/2020 | Jaenisch et al. |
| 2020/0326695 | A1 | 10/2020 | Jaenisch et al. |
| 2020/0362334 | A1 | 11/2020 | Regev et al. |
| 2021/0027171 | A1 | 1/2021 | Jaenisch et al. |
| 2021/0060858 | A1 | 3/2021 | Rakshit |

FOREIGN PATENT DOCUMENTS

| | | | |
|---|---|---|---|
| WO | WO-2019199769 | A1 | 10/2019 |
| WO | WO-2019199777 | A1 | 10/2019 |
| WO | WO-2020172122 | A1 | 8/2020 |
| WO | WO-2020172124 | A1 | 8/2020 |
| WO | WO-2021016533 | A1 | 1/2021 |

OTHER PUBLICATIONS

"International Application Serial No. PCT/US2020/018570, International Search Report dated Apr. 28, 2020", 4 pgs.
"International Application Serial No. PCT/US2020/018570, Written Opinion dated Apr. 28, 2020" 7 pgs.
"International Application Serial No. PCT/US2020/018574, International Search Report dated Apr. 28, 2020", 4 pgs.
"International Application Serial No. PCT/US2020/018574, Written Opinion dated Apr. 28, 2020", 7 pgs.
"U.S. Appl. No. 16/281,888, Corrected Notice of Allowability dated Jan. 27, 2021", 2 pgs.
"U.S. Appl. No. 16/281,888, Examiner Interview Summary dated Aug. 10, 2020", 3 pgs.
"U.S. Appl. No. 16/281,888, Notice of Allowance dated Oct. 20, 2020", 12 pgs.
"U.S. Appl. No. 16/281,888, Response filed Aug. 18, 2020 to Non Final Office Action dated May 19, 2020", 10 pgs.
"U.S. Appl. No. 16/379,154, Examiner Interview Summary dated Jan. 8, 2021", 2 pgs.
"U.S. Appl. No. 16/379,154, Non Final Office Action dated Oct. 15, 2020", 25 pgs.
"U.S. Appl. No. 16/379,154, Response filed Jan. 14, 2021 to Non Final Office Action dated Oct. 15, 2020", 10 pgs.
"U.S. Appl. No. 16/379,162, Examiner Interview Summary dated Feb. 12, 2021", 2 pgs.
"U.S. Appl. No. 16/379,162, Non Final Office Action dated Nov. 10, 2020", 20 pgs.
"U.S. Appl. No. 16/379,162, Response filed Feb. 10, 2021 to Non Final Office Action dated Nov. 10, 2020", 8 pgs.
"International Application Serial No. PCT/US2019/026338, International Preliminary Report on Patentability dated Oct. 22, 2020", 9 pgs.
"International Application Serial No. PCT/US2019/026514, International Preliminary Report on Patentability dated Oct. 22, 2020", 7 pgs.
"International Application Serial No. PCT/US2019/026522, International Preliminary Report on Patentability dated Oct. 22, 2020", 7 pgs.
"International Application Serial No. PCT/US2020/043434, International Search Report dated Oct. 16, 2020", 4 pgs.
"International Application Serial No. PCT/US2020/043434, Written Opinion dated Oct. 16, 2020", 5 pgs.
Deng, Song, et al., "Distributed intrusion detection based on hybrid gene expression programming and cloud computing in a cyber physical power system", IET Control Theory And Applications, The Institution of Engineering and Technology, GB, vol. 11. No. 11, (Jul. 14, 2017), 1822-1829.
Elsayed, Saber, et al., "Evaluating the performance of a differential evolution algorithm in anomaly detection", IEEE Congress on Evolutionary Computation (CEC), IEEE, (May 25, 2015), 2490-2497.
Holnglei, Gao, et al., "A GEP-Based Anomaly Detection Scheme in Wireless Sensor Networks", Computational Science and Engineering, CSE '09. International Conference on, IEEE, Piscataway, NJ, USA, (Aug. 29, 2009), 817-822.
"International Application Serial No. PCT/US2019/026514, International Search Report dated Jul. 5, 2019", 5 pgs.
"International Application Serial No. PCT/US2019/026514, Written Opinion dated Jul. 5, 2019", 8 pgs.
"International Application Serial No. PCT/US2019/026522, International Search Report dated Jul. 8, 2019", 4 pgs.
"International Application Serial No. PCT/US2019/026522, Written Opinion dated Jul. 8, 2019", 5 pgs.
Farlow, Stanley, "The GMDH Algorithm of Ivakhnenko", The American Statistician, vol. 35, No. 4, (1981), 210-215.
Ferreira, Candida, "Gene Expression Programming in Problem Solving", Soft Computing and Industry, (2002), 635-653.
Ferreira, Candida, "Gene Expression Programming: A New Adaptive Algorithm for Solving Problems", Complex Systems, vol. 13, issue 2, (2001), 22 pgs.
Gabor, D, et al., "A Universal Non-linear filter, predictor and simulator which optimizes", The Institution of Electrical Engineers, Paper No. 3270 M, (1960), 422-435.
Ivakhnenko, A G, "Heuristic Self-Organization in Problems of Engineering Cybernetics", Automatica, vol. 6, (1969), 207-219.
Ivakhnenko, A G, et al., "The Review of Problems Solvable by Algorithms of the Group Method of Data Handling (GMDH)", Pattern Recognition and Image Analysis, vol. 5, No. 4, (1995), 527-535.

(56) References Cited

OTHER PUBLICATIONS

Jaenisch, Holger, et al., "A novel application of data modeling for extracting mathematical ontologies and relationship matrix features from text documents", SPIE Defense + Commercial Sensing, (2005), 12 pgs.

Jaenisch, Holger, et al., "A robust regularization algorithm for polynomial networks for machine learning", Proc. SPIE 8059, Evolutionary and Bio-Inspired Computation: Theory and Applications V, 80590A, (May 2011), 21 pgs.

Jaenisch, Holger, et al., "Autonomous Journaling Response Using Data Model LUTS", Proc. of SPIE vol. 7344, (2009), 11 pgs.

Jaenisch, Holger, "Converting data into functions for continuous wavelet analysis", Proceedings of SPIE—The International Society for Optical Engineering, (pp. 2-13), (2009), 13 pgs.

Jaenisch, Holger, "Data Modeling Applications in Space Science and Astronomy", PhD thesis, James Cook University (pp. 1-130 of 255 pages total), (2009), 130 pgs.

Jaenisch, Holger, "Data Modeling Applications in Space Science and Astronomy", PhD thesis, James Cook University (pp. 131-256 of 255 pages total), (2009), 126 pgs.

Jaenisch, Holger, et al., "Data Modeling for Change Detection of Inventory Flow and Instrument Calibration", Proceedings of SOLE, (2003), 10 pgs.

Jaenisch, Holger, et al., "Data Modeling for Fault Detection", MFPT, (2003), 10 pgs.

Jaenisch, Holger, et al., "Data Modeling for network dynamics", Proceedings of SPIE—The International Society for Optical Engineering, (2004), 12 pgs.

Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.

Jaenisch, Holger, et al., "Data-modeling-enabled guidance, navigation, and control to enhance the lethality of interceptors against maneuvering targets", Proceedings of SPIE—The International Society for Optical Engineering Mar. 2005, 13 pgs.

Jaenisch, Holger, et al., "Digital MicroArray Analysis For Digital Artifact Genomics", Cyber Sensing, (2013), 20 pgs.

Jaenisch, Holger, "Entropyology: Microarray Analysis Analogy for Digital Artifact Discrimination", Proceedings of SPIE, vol. 8359, (2012), 20 pgs.

Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.

Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.

Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.

Jaenisch, Holger, et al., "Shai-Hulud The quest for worm sign", Proc. SPIE 5812, Data Mining, Intrusion Detection, Information Assurance, and Data Networks Security, (2005), 9 pgs.

Jaenisch, Holger, et al., "Spatial Voting for Automatic Feature Selection, Fusion and Visualization", Proc. SPIE 8756, Multisensor, Multisource Information Fusion: Architectures, Algorithms, and Applications, (2013), 21 pgs.

Jaenisch, Holger, "Spatial Voting with Data Modeling", Sensor Fusions and its Applications, (2010), 153-178.

Jaenisch, Holger, et al., "Virtual Instrument Prototyping with Data Modeling", (2003), 15 pgs.

Kamalika, Bhattacharjee, et al., "A Survey of Cellular Automata: Types, Dynamics, Non-uniformity and Applications", Arxiv.Org, Cornell University Library, 201 Olin Library Cornell University Ithaca, NY, (Jul. 8, 2016).

Oltean, Mihai, et al., "An autonomous GP-based system for regression and classi?cation problems", Applied Soft Computing 9, (2009), 49-60.

"International Application Serial No. PCT/US2019/026338, International Search Report dated Jun. 21, 2019", 5 pgs.

"International Application Serial No. PCT/US2019/026338, Written Opinion dated Jun. 21, 2019", 7 pgs.

U.S. Appl. No. 16/297,202, filed Mar. 8, 2019, Machine Learning Technique Selection and Improvement.

U.S. Appl. No. 16/379,154, filed Apr. 9, 2019, Cyber Chaff Using Spatial Voting.

U.S. Appl. No. 16/379,162, filed Apr. 9, 2019, Encryption Using Spatial Voting.

U.S. Appl. No. 16/381,179, filed Apr. 11, 2019, Behavior Monitoring Using Convolutional Data Modeling.

U.S. Appl. No. 16/522,235, filed Jul. 25, 2019, Gene Expression Programming.

U.S. Appl. No. 16/554,206, filed Aug. 28, 2019, Alternative Techniques for Design of Experiments.

U.S. Appl. No. 16/281,888, filed Feb. 21, 2019, Anomaly Detection With Reduced Memory Overhead.

U.S. Appl. No. 16/281,922, filed Feb. 21, 2019, Anomaly Detection With Adaptive Auto Grouping.

Jaenisch, H, et al., "Generalized information fusion and visualization using spatial voting and data modeling", Society of Photo-Optical Instrumentation Engineers SPIE Proceedings vol. 8756 No 875609, (May 2013), 16 pgs.

"U.S. Appl. No. 16/281,922, Non Final Office Action dated Sep. 2, 2021", 9 pgs.

"U.S. Appl. No. 16/379,154, Advisory Action dated Aug. 30, 2021", 6 pgs.

"U.S. Appl. No. 16/379,154, Amendment & Response Under 37 C.F.R. § 1.116 filed Sep. 29, 2021", 11 pgs.

"U.S. Appl. No. 16/379,154, Final Office Action dated Apr. 29, 2021", 32 pgs.

"U.S. Appl. No. 16/379,154, Response filed Jul. 29, 2021 to Final Office Action dated Apr. 29, 2021", 11 pgs.

"U.S. Appl. No. 16/379,162, Notice of Allowance dated May 26, 2021", 11 pgs.

"U.S. Appl. No. 16/381,179, Supplemental Notice of Allowability dated Aug. 18, 2021", 3 pgs.

"U.S. Appl. No. 16/381,179, Examiner Interview Summary dated Sep. 30, 2021", 2 pgs.

"U.S. Appl. No. 16/381,179, Non Final Office Action dated Jun. 25, 2021", 10 pgs.

"U.S. Appl. No. 16/381,179, Response filed Sep. 27, 2021 to Non Final Office Action dated Jun. 25, 2021", 10 pgs.

"U.S. Appl. No. 16/522,235, Non Final Office Action dated Aug. 16, 2021", 11 pgs.

"International Application Serial No. PCT/US2020/018570, International Preliminary Report on Patentability dated Sep. 2, 2021", 9 pgs.

"International Application Serial No. PCT/US2020/018574, International Preliminary Report on Patentability dated Sep. 2, 2021", 9 pgs.

"U.S. Appl. No. 16/522,235, Response filed Nov. 16, 2021 to Non Final Office Action dated Aug. 16, 2021", 9 pgs.

"U.S. Appl. No. 16/281,922, Examiner Interview Summary dated Nov. 29, 2021", 2 pgs.

"U.S. Appl. No. 16/522,235, Final Office Action dated Nov. 30, 2021", 15 pgs.

"U.S. Appl. No. 16/281,922, Response filed Dec. 2, 2021 to Non Final Office Action dated Sep. 2, 2021", 11 pgs.

* cited by examiner

DEVICE BEHAVIOR ANOMALY DETECTION

RELATED APPLICATION

This application claims the benefit of priority to U.S. Provisional Patent Application Ser. No. 62/655,564, filed on Apr. 10, 2018, and titled "EMBEDDED DISTRIBUTED ANOMALY DETECTION", which is incorporated by reference herein in its entirety.

TECHNICAL FIELD

Embodiments relate to computer or information security. Some embodiments regard identifying an anomaly in device operation, communication, or information content.

TECHNICAL BACKGROUND

Computer security is a difficult and important task. Computer security, cybersecurity, or information technology (IT) security is the protection of computer systems from theft or damage to their hardware, software, or electronic data, as well as from disruption or misdirection of the services they provide. The difficulty of implementing security increases on a memory or processor-restricted device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
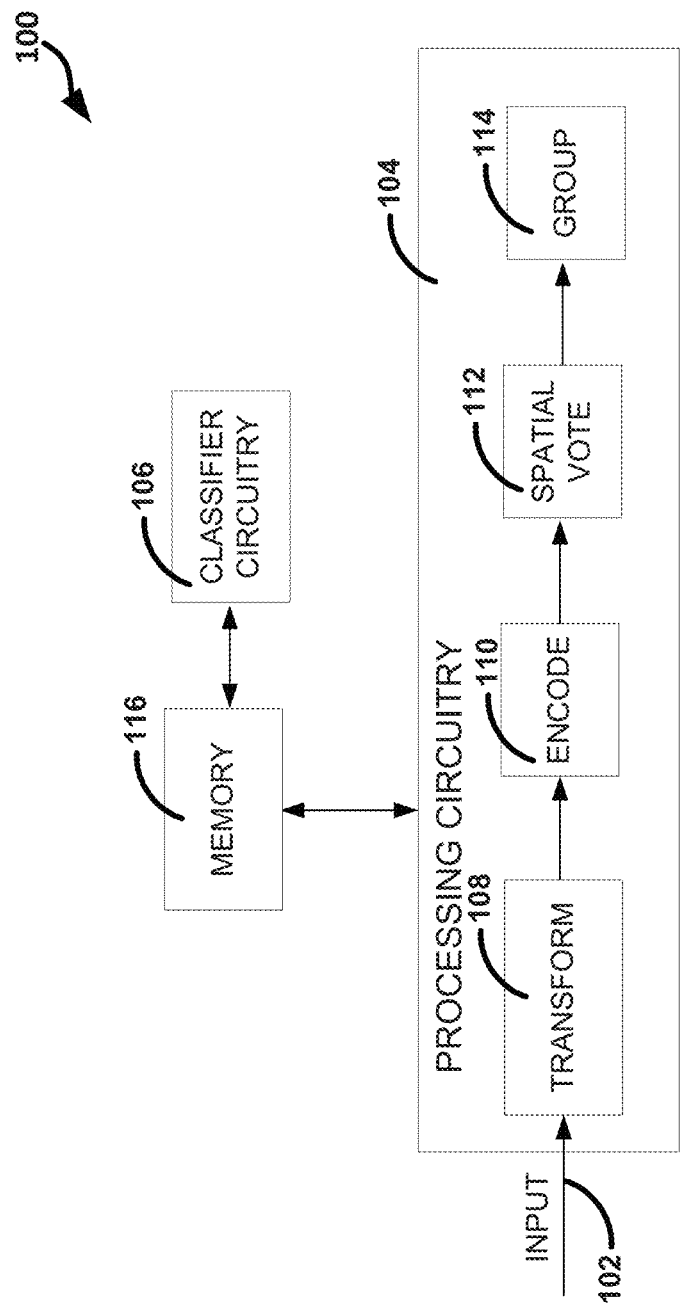
FIG. 1 illustrates, by way of example, a diagram of an embodiment of a system for anomaly detection.

Some embodiments relate to anomaly detection. An "anomaly", as used herein, means detected behavior not seen or experienced before now. Embodiments can be agnostic to data type, format, source, or examples. Embodiments can be self-initializing, adaptive, and self-aware.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments can be embedded into firmware and driven by communications between devices, or between components of a same device. The device can include a radar, missile, smartphone, appliance, vehicle, an Internet of Things (IoT) device, or any other device. The device need only transmit a wired or wireless communication. The communication can include a sensor measurement including, but not limited to, voltages, currents, and any other physics-based parameters, as well as binary or digital data obtained from sensors. The communication can include data provided between layers of or to components on a same layer of the same device. A layer of a device can include the physical layer, application layer, medium access control (MAC) layer, application layer, network layer, or the like.

Embodiments can use Information Theoretic Methods (ITM) to achieve compressive sensing encoding of data streams, sequences, or packets that are order sensitive to the symbol sequence. The encoding can provide a hash-like function with nearness, removing external definitions of similarity, or a requirement for nearest neighbor calculations.

This disclosure uses for an illustrative use case, but is not limited to, cyber event or network data. The disclosure further illustrates how numeric encoding of data enables adaptive Spatial Voting (SV) grids to automatically detect a cyber-attack event. Embodiments can use discrete mapping of two-dimensional (2-D) scatter plot information to establish a baseline pattern of populated grid cells. Comparison is achieved by calculating the grid cell assignment for a newly encoded data item, and testing if the cell index value already exists in a dictionary or lookup table. If it does, the data item is ignored as a minor variant of something previously encountered and a vote or stack count of a grid index (sometimes called a key value) can be incremented. However, if the proposed new grid key value does not already exist in the dictionary or lookup table, the data item is declared anomalous and can be recorded in an anomaly storage file and a new grid key added to the recognized key dictionary or lookup table.

Monitoring changes, such as across epochs, provides an ability to detect anomalies in a wide variety of situations. Applications can include packet or other data detection in a network (e.g., thumb drive insertion and the launch of a bot in the associated network, bus anomaly detection, corrupt packet detection and initialization when running simulations, finding packet fragments drift errors message types, or the like), device (e.g., helicopter, missile, [airplane and or associated 1553b system messaging and control bus], [automotive vehicle and associated Controller Area Network (CAN bus) messaging and control busses], truck, radar, satellite, appliance, phone, computer, sensor, internet of things (IOT) device, embedded device, or the other manned or unmanned device, software or firmware based firewalls, black list/white list processes, malware or malicious behavior detection processes, surveillance systems including passive and active EM and non EM based systems) including large scale systems such as Power Generation Facilities, Manufacturing Facilities, Remote monitoring Facilities and any operational system of systems that uses active or passive "controllers" as part of the operation and decision making process both with and without and operation error detection (e.g., vibration fault detection, data fault detection, system configuration change detection, high priority alert thinning to relevant anomalies, query information variety discovery and unique information detection, natural language processing (NLP), entry matching such as in a maintenance log or other log (e.g., to directly associate entries about a same item or even when different technicians use different abbreviations or descriptions but are discussing a common symptom or part), matching job descriptions to resumes, text matching (e.g., finding documents that relate to search example of interest even if key words are absent), predicting time to failure (e.g., by monitoring how often new anomalies are detected as indication of system status change to a new or worse steady state), relevant detection of changes in scenes or video streams, such as full motion video real time feeds or isolating subset of frames from blurry movies or image streams enabling high resolution enhancement, such as for deep sky astronomy showing better performance than using adaptive optics as well as surveillance imagery, lossless compression of data extracting minimum relevant sub sample if data is sufficient for a secondary or tertiary decision making process, fusing multiple information sources to rapidly enable situation awareness such as in multi-intelligence (INT) scenarios, among others.

This disclosure covers the encoding process, the SV method, and how areas of regard are defined and how they are used to declare or confirm events as anomalous or recognized as they occur. Embodiments can provide an automated report. The report can be generated for an analyst. The report can isolate aspects of the behavior responsible for triggering the event along with confidence intervals and statistical tests of significance to isolate the behavior with relevant information.

Embodiments can operate based on a plurality of information theoretic techniques arranged to enable anomaly detection. The techniques can operate without requiring training in the traditional machine learning (ML) sense. Embodiments can leverage numeric compressive sensing statistical encoding of binary data into (x, y) pairs reducing dimensionality from many to two (2) using SV grids.

Anomalies, as used herein, are defined as being "something never experienced before now". This definition inherently puts an order dependency or temporal component to the definition of anomaly.

A self-adapting SV grid can be enabled to auto adjust both its spatial extent and resolution. The adjustment can be driven by newly experienced encoded data. The first data item that creates a new grid cell "key value" can be identified. Any further data that encodes into an existing grid cell increases the stack count for the cell. These data can be deemed trivial variations of what has already been encountered. Such adaptive partitioning of data extracts relevant dynamic variants and yields what may be thought of as "margin points" or support vectors from support vector machine (SVM), but using a completely orthogonal and unrelated methodology. In some embodiments, no use of "truth" labels is made. In various embodiments, grouping and partitioning is done using information theory. Some embodiments can use the encoded statistical estimators as (X, Y) pairs. This is metaphorically similar to principal component 1 and principal component 2, but using none of the eigenvalue math/linear algebra principal component analysis (PCA) uses and obtaining the result in real-time. Various embodiments can be implemented on a multi-threaded process, such as in a distributed parallel fashion.

Reported events can include one or more anomalies. Runs of anomalies that fall more frequently outside a predicted area of regard region can signal a systemic persistent shift in observed system state and behavior, as opposed to intermittent spurious anomalies in recurring realms. These runs can correspond to important behavior changes and can be alerted.

In literature anomalies are synonymous with "bad behaviors". This is occurring in ML since, by definition, ML methods rely on "optimization strategies" to define decision boundaries and create classifiers with targeted "equal error rate". These ML methods are subject to the limitations of both Wolpert's No Free Lunch Theorem (NFL) and the Ugly Duckling Theorem. This is because ML classifiers measure differences and distinctions between two or more things. Whenever such a comparison is made it reduces mathematically to a set of ratios. For a given numerical value, there are an infinite number of numerator and denominator combinations that result in the same numerical equivalent value making the ratio concept non-unique. Thus, methods that require differencing require 2 or more classes to find differences and by definition cannot discover fundamental ab-initio traits that have a physics-based meaning. Hence the ability to learn only 1 class "normal" is intractable. Rather than admitting the in-admissibility of ML as method for detecting "anomalies", the ML community has attempted to cheat the math by taking what is normal and creating "artificial" data, to turn a single class case into a contrived two class case. The ML then proceeds by training. What is being learned is the differences between the normal data and the contrived data, which are very unlikely the same as the unknown-unknown data that has yet to be encountered, hence such classifiers when deployed suffer from at least two problems. These ML techniques make a class declaration (if 3 classes were trained on, one of the three will be declared no matter how unlikely they are, they simply report with a lower probability or confidence and the ML technique generally cannot return an "unknown" state). The need for confidences and probabilities leads to a third issue of having to set thresholds ad hoc and post hoc based on limited simulated testing and retesting upon failure. In all cases, a known equal error rate is minimized but specificity of one (e.g., no false positives) is not obtainable, hence it is known generally how many false positives to expect at best with no means of ferreting them out.

Truly detecting an unknown-unknown requires context that is created in-situ as data is processed and encountered, thus yielding experience. The process can then, upon organizing what has been seen into partitions of similar based on numeric binning, determine if the new data falls into an existing bin or not. If it does, it is not novel. If it does not, then it has never been encountered before and is indeed an anomaly and worthy of further reconsideration in a post process or downstream inspection.

Some embodiments can include "self-aware" and fully adaptive processes. Self-awareness, as used herein, means defining self in terms of aggregate of experiences and an ability to discern a new stimulus as being either self or not self. This self-awareness eliminates traditional training and need for labeled data, it yields data thinning to relevant cases, and enables self-supervised classifiers and detectors to be created and employed upstream of itself, filter out with black/white list capability those things which have been encountered before to disregard them. The self-supervised classifier can generate labels of temporal group and key index values. The labels can be replaced with human interpretable grammar without requiring any change in the defined groupings and encoded mappings into such groups. Embodiments enable an anomaly detection process to be sped up over time as the full range of system dynamics are encountered and yet remain sensitive to the new unknown-unknowns.

Embodiments can make a determination much faster than a k-means clustering technique used on the same data. First, embodiments include no training time. Second, embodiments include simpler, more cost-effective processing eliminating the need for k-means clustering while autonomously partitioning data into groups that preserve similarity. Embodiments can eliminate the need for random selection of data starting points, eliminate the need to define the number of clusters to look for or attempt to assign the data to, and eliminate a subsequent Monte Carlo rerun and artificial monitoring for subjective convergence of cluster number and membership.

Innovative aspects can include, but are not limited to: Exclusive use of information theoretic methods to detect unknown-unknown anomalies without a priori training; data source and format agnostic processing; ability to thin data stream to relevant variants to represent full dynamic process; leveraging compressive sensing to yield (x, y) values readily encoded onto SV grids for auto-partitioning; ability to execute using distributed kernel multi-core-architecture; ability to export detectors as classifiers without training labels required to make them run independent of this process and embody its full knowledge for further anomaly detection being able to blacklist/white list and declare new data objects as unrecognized without using thresholds; and ability to execute in embedded hardware for using online data feeds and streaming data for partitioning data into relevant chunks for offline reprocessing.

Various embodiments described herein provide streaming and real-time enabled embedded anomaly detection of type and format agnostic data sets. Some embodiments include proven anomaly detection maintained while performance "throughput" and "stability of execution time" is improved. Various embodiments demonstrate that the system is fully adaptive and self-initializing requiring no a priori training data to function correctly.

FIG. 1 illustrates, by way of example, a diagram of an embodiment of a system 100 for anomaly detection. The system 100 as illustrated includes processing circuitry 104, classifier circuitry 106, and a memory 116. The processing circuitry 104 can identify an anomaly (a behavior that has not been seen by the processing circuitry 104 up to the point the behavior is seen). The classifier 106 can present the anomaly to a user for action, adjust SV grid parameters, or the like. The memory 116 can store key values, SV grid parameters, or other data input or output from the processing circuitry 104.

The processing circuitry 104 receives input 102. The input 102 can include binary data, text, signal values, image values, or other data that can be transformed to a number. The processing circuitry 104 can transform the input 102 to a number, at operation 108. The operation 108 can include encoding the input into a specified format, parsing the data into chunks (e.g., chunks of a specified size), or the like. For example, the operation 108 can include encoding text input to an American Standard Code for Information Interchange (ASCII) encoding to transform the input 102 into numbers between zero (0) and two hundred fifty-five (255). In another example, the operation 108 can include converting chunks of binary data to their numerical equivalent, such as two's complement, unsigned integer, floating number (e.g., short or long), or the like. In yet another example, the operation 108 can include performing an analog to digital conversion on analog signal data, such as by an analog to digital converter. In yet another example, the operation 108 can include combining red, green, blue (RGB) values of a color image, or the like, to generate a number. Not all input 102 needs to be transformed, thus the operation 108 is optional.

The processing circuitry 104 can receive numbers either as raw input 102 or from the operation 108 and encode the numbers into two features (discussed below) at operation 110. The operation 110 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2, ... n.
RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i/n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. 5-type features tend to spread data along one spatial grid axis more than another. Note, if the occupied cells in the SV spatial grid fall along a 45 degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes, and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same feature can be used on different data. For example, TS on a subset of columns of data from a row in a comma separated values (CSV) data file can form a feature 1, while TS on the same row of data but using a different subset of columns can form a feature 2. Many other variants are possible.

In some embodiments, one or more features can be determined based on a length of a corresponding data item. The length-based features are sometimes called LRM, LRS, LSM, LSS, etc.

The features of Equations 1-9 are order-dependent. The features can be plotted against each other on a grid of cells, at operation 112. The processing circuitry 104 can initialize an SV grid to which the encoded inputs are mapped, such as at operation 112.

Plotted values can be associated or correlated, such as at operation 114. The operation 114 can include forming groups of mapped inputs and determining an extent thereof. More details regarding the operations 108-114 are provided in FIGS. 2-4.

The classifier circuitry 106 can provide a user with a report indicating behavior that is anomalous. An input mapped to a cell that was not previously populated is considered anomalous. If an input is mapped to a cell that already has an input mapped thereto by the features, the input can be considered recognized. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 106, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 106 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 116 and monitored by the processing circuitry 104.

In some embodiments, an event for the report can include a single anomalous behavior. In some embodiments, an event for the report can be reported in response to a specified threshold number of type 2 anomalies.

The classifier circuitry 106 can adjust SV grid parameters. An initial size of an SV grid cell can be determined. In some embodiments, the initial size of the SV grid cell can include dividing the space between (0,0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x (feature 1) and y (feature 2) are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$\text{Row}=\text{int}(\text{Key Value}/(\text{number of cells on side})) \quad \text{Equation 10}$$

$$\text{Col}=\text{Key Value}-\text{int}(\text{Row}*(\text{number of cells on side})) \quad \text{Equation 11}$$

$$\text{Center 1}=x\text{ min}+\text{Col}*(x\text{ range})/(\text{num. col}-1) \quad \text{Equation 12}$$

$$\text{Center 2}=y\text{ min}+\text{Row}*(y\text{ range})/(\text{num. row}-1) \quad \text{Equation 13}$$

The values for Center 1 and Center 2 can then be used in Equations 14, 15, and 16 as Feature 1 and Feature 2 to calculate the new Key Value for each populated cell on the new SV grid.

Figure 2:
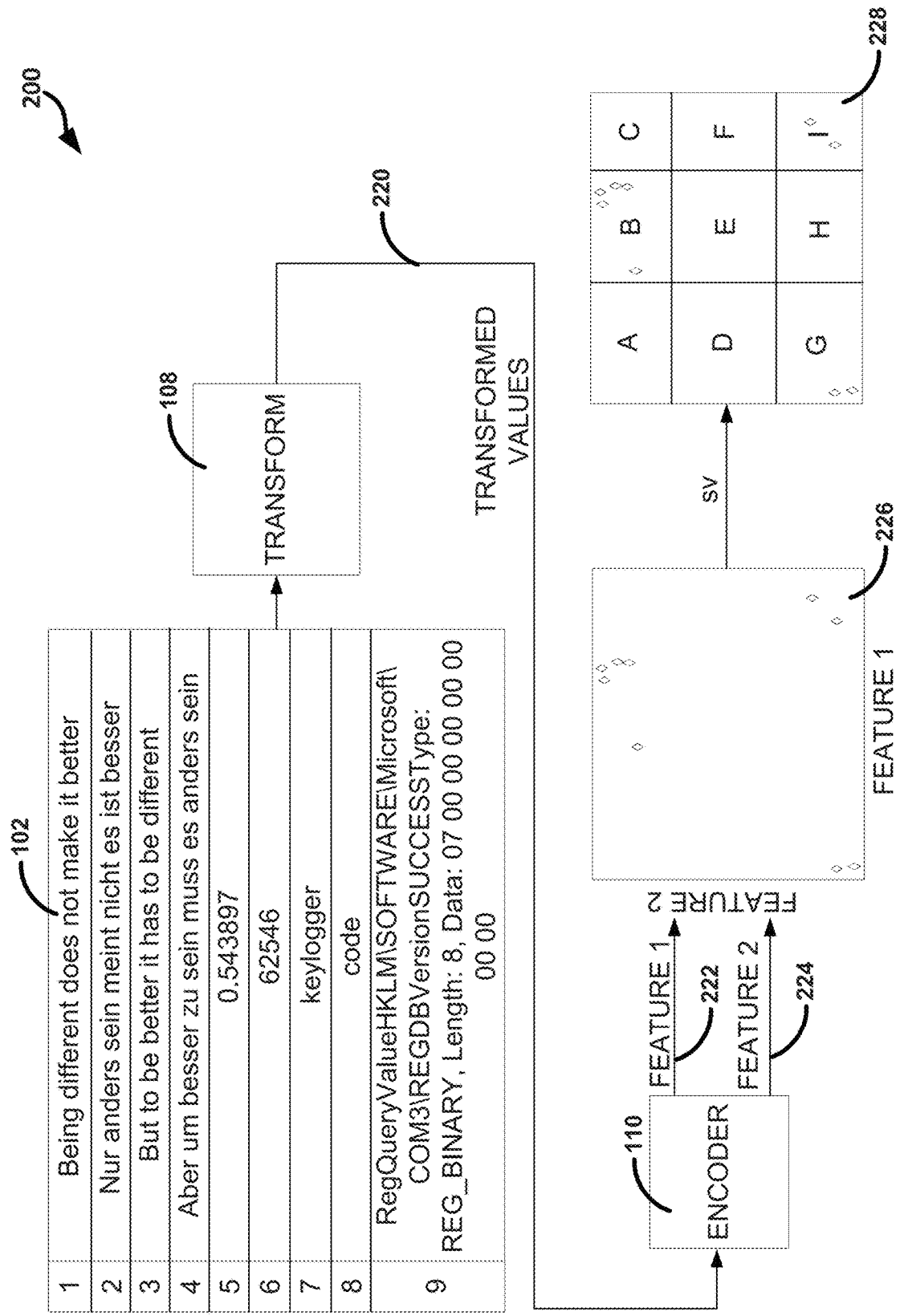
FIG. 2 illustrates, by way of example, a diagram of an embodiment of a method for identifying an anomalous behavior.

FIG. 2 illustrates, by way of example, a diagram of an embodiment of a method 200 for identifying an anomalous behavior. The method 200 as illustrated includes receiving the input 102. The input 102 in FIG. 2 includes nine text strings labelled "1"-"9". Each of the text strings "1"-"9" of the input 102 is respectively transformed to transformed values 220 at operation 108. An example transformation is ASCII encoding which transforms text to numerical values. The transformed values 220 can be used to perform the operation 110. The operation 110 can include determining two features 222, 224 of the input 102 and plotting them against each other to form a feature graph 226. The features 222, 224 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_i$, is the ASCII value of each character and the features are determined over all ASCII encodings of the characters of the input data item "1". As an example, the resultant RM can be feature 1 222 and the resultant RS can be feature 2 224, or vice versa. This is merely an example and any order-dependent feature can be chosen for feature 1 and any order-dependent feature chosen for feature 2. Each of the input data items "1"-"9" can be processed in this manner at operation 108 and 110.

The graph 226 can then be split into cells to form a grid 228. The cells of FIG. 2 are labelled "A"-"I" for illustration (we will introduce Key Values to numerically label the SV grid cells in Equation 16). Inputs 102 mapped to a same cell can be considered similar. Inputs 102 mapped to an empty cell can be considered anomalous. In the grid 228, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input data item 102 were to be received and mapped to cell "A", "C", "D", "E", "F", or "H" it can be deemed anomalous, as it is a behavior that has not been received before and is sufficiently different from other behaviors that have been seen previously.

Figure 3:
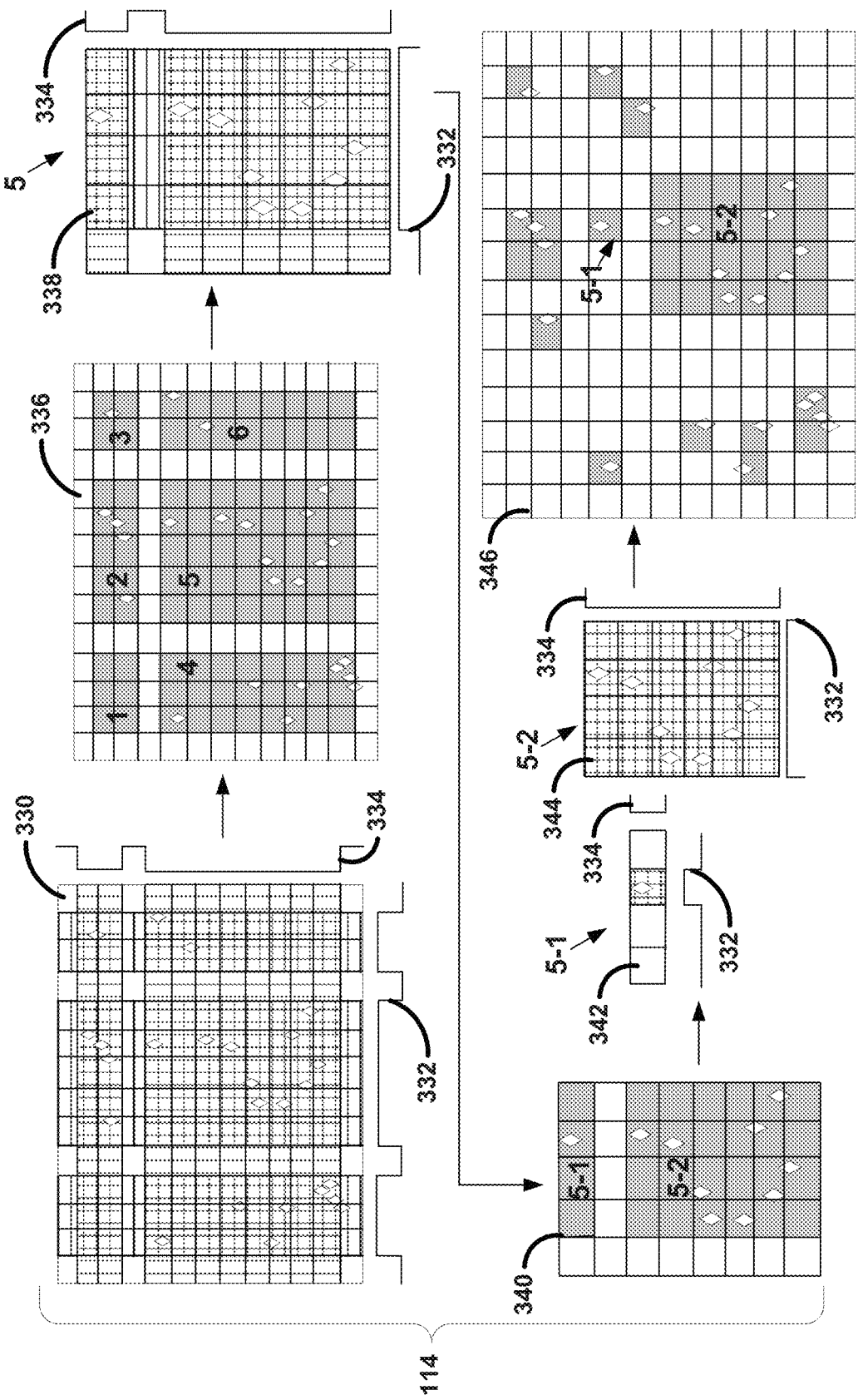
FIG. 3 illustrates, by way of example, a diagram of an embodiment of a grouping operation.

FIG. 3 illustrates, by way of example, a diagram of an embodiment of the operation 114. Encoded inputs ((x, y) points) are represented by diamonds. The operation 114 (sometimes called shadowing for group extraction) can include an iterative process that identifies cells that are populated and aggregates and separates those cells into groups. The iterative process can include:
1) Identifying cells of columns with at least one populated cell at operation 332 (indicated by horizontal hashing in graph 330)
2) Identifying cells of rows with at least one populated cell at operation 334 (indicated by vertical hashing in graph 330)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 336 illustrates the result of a first iteration of performing the operations (1)-(3). After the first iteration, six groups "1"-"6" in FIG. 3 are formed. Next each of the groups "1"-"6" are processed by operations (1)-(3). In FIG. 3, the second iteration is illustrated for group "5". The operations 332 and 334 can be performed on a sub-grid 338 formed by the cells of group "5". A graph 340 illustrates the result of the second iteration of performing the operations (1)-(3). After a second iteration on group "5", two sub-groups "5-1" and "5-2" are formed in the example of FIG. 3.

In the example of FIG. 3, a third iteration of the operations (1)-(3) is performed on the subgroups "5-1" and "5-2". The operations 332 and 334 can be performed on sub-grids 342, 344 formed by the cells of sub-groups "5-1" and "5-2". A graph 346 illustrates the result of the performing all iterations of the operations (1)-(3) and the groups formed therefrom.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$\text{Col}=\text{int}((\text{feature } 1-x \text{ min})*(\text{num. col}-1)/(x \text{ range})) \quad \text{Equation 14}$$

$$\text{Row}=\text{int}((\text{feature } 2-y \text{ min})*(\text{num. row}-1)/(y \text{ range})) \quad \text{Equation 15}$$

An encoding on the grid, sometimes called key value, can be determined using Equation 16:

$$\text{Key Value}=\text{num. row}*\text{Row}+\text{Col} \quad \text{Equation 16}$$

The "x min", "y min", "x max", and "y max" can be stored in the memory 116. Other values that can be stored in the memory 116 and relating to the grid of cells include "max grid size", "min grid size", or the like. These values can be used by the processing circuitry 104 to determine "x range", "num. col.", "y range", or "num. row", such as to assemble the grid of cells or determine a key value for a given encoded input (e.g., (feature 1, feature 2)).

A series of key values representing sequential inputs can be stored in the memory 116 and used by the classifier circuitry 106, such as to detect malicious (not necessarily anomalous) behavior. A malicious or other behavior of interest can be operated on by the processing circuitry 104 and the key values of the behavior can be recorded. The key values can be stored and associated with the malicious behavior. Key values subsequently generated by the processing circuitry 104 can be compared to the key values associated with the malicious behavior to detect the malicious behavior in the future.

Figure 4:
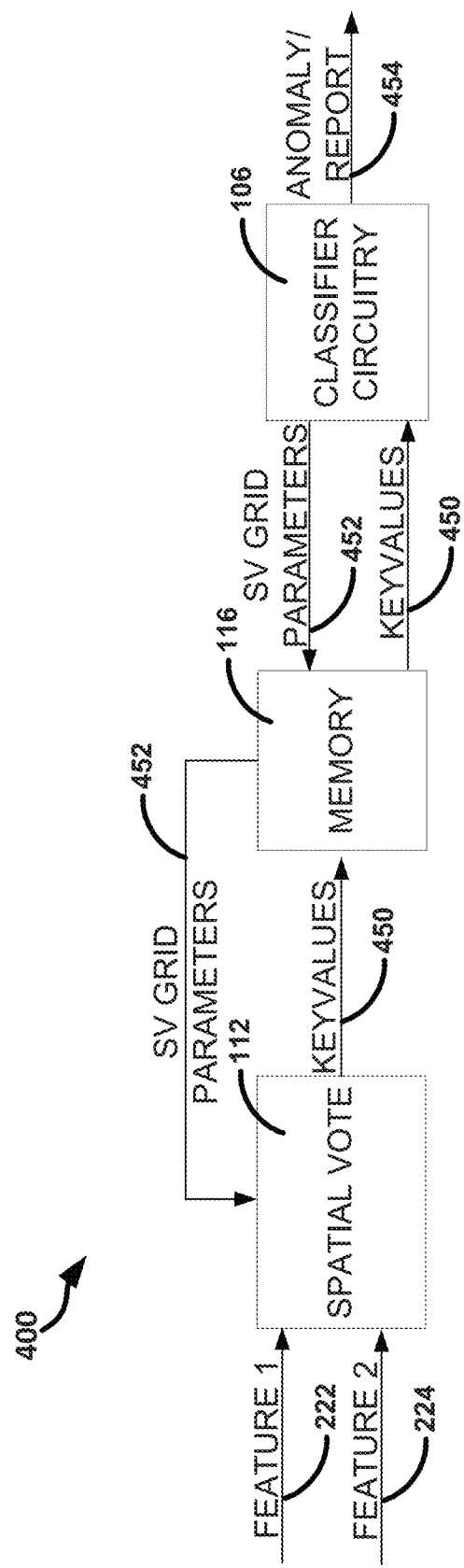
FIG. 4 illustrates, by way of example, a diagram of an embodiment of a system for anomaly detection.

FIG. 4 illustrates, by way of example, a diagram of an embodiment of a system 400 for anomaly detection. The system 400 includes an exploded view diagram of a portion of the system 100. The system 400 as illustrated includes the operation 112 of the processing circuitry 104, the memory 116, and the classifier circuitry 106. The operation 112 determines key values 450 based on SV grid parameters 452 from the memory 116 and features 222, 224 determined by the processing circuitry 104.

The key values in the memory 116 can allow for F-testing, t-testing, or Z-score analysis, such as by the classifier circuitry 106. These analyses can help identify significant columns and cells. The classifier circuitry 106 can provide event and pre-event logs in a report 454, such as for further analysis. The report 454 can provide information on which column or cell corresponds to the most different behavior.

Figure 5:
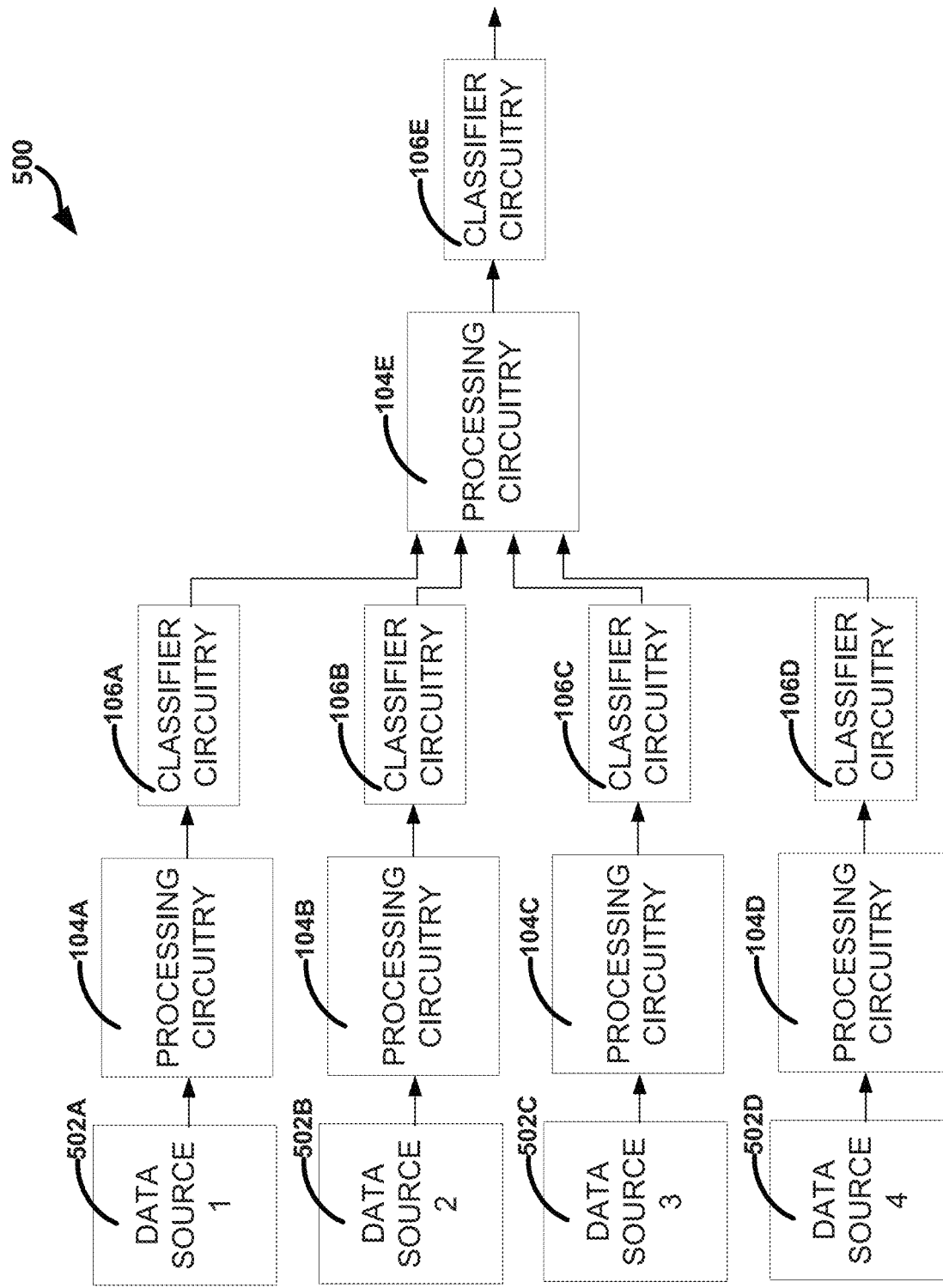
FIG. 5 illustrates, by way of example, a diagram of an embodiment of another system for anomaly detection.

FIG. 5 illustrates, by way of example, a diagram of an embodiment of a system 500 for anomaly detection. In some instances, an entity can have many data sources 502A, 502B, 502C, 502D to be monitored. The data sources 502A-502D can be output of a device, a logical layer (e.g., physical, data link, network, transport, session, presentation, application, medium access control (MAC), or other layer), a component, or the like of a device. The device itself or an external monitor can implement an instance of the processing circuitry 104 or the classifier circuitry 106. The amount of data produced by such anomaly monitoring can still be prohibitively large. This data can be thinned further by a more centralized anomaly detector, and so on. The system 500 of FIG. 5 illustrates an embodiment of this sort of "distributed-to-centralized" anomaly detection.

Each data source 502A-502D provides data to respective processing circuitry 104A, 104B, 104C, 104D that performs operations 108, 110, 112, 114 (if needed). The processing circuitry 104A-104D provides key values, group data, or the like to respective classifier circuitry 106A, 106B, 106C, 106D. The classifier circuitry 106A-106D identifies whether there are any anomalies in the data from the data source 502A-502D based on the data from the processing circuitry 104A-104D. The classifier circuitry 106A-106D can provide data corresponding to detected anomalies to a more centralized processing circuitry 104E. Since the processing circuitry 104E receives data regarding multiple data sources (data sources 502A-502D in the example of FIG. 5), the processing circuitry 104E can have a more global understanding of what behavior is anomalous for a specific data source 502A-502D. That is, a behavior can be considered anomalous to the classifier circuitry 106A-106D, but not the classifier circuitry 106E, because the classifier circuitry 106E is exposed to more behavior than the classifier circuitry 106A-106D. This distributed-to-centralized system 500 provides further data thinning to help better focus on what is truly new or emerging behavior.

Figure 6:
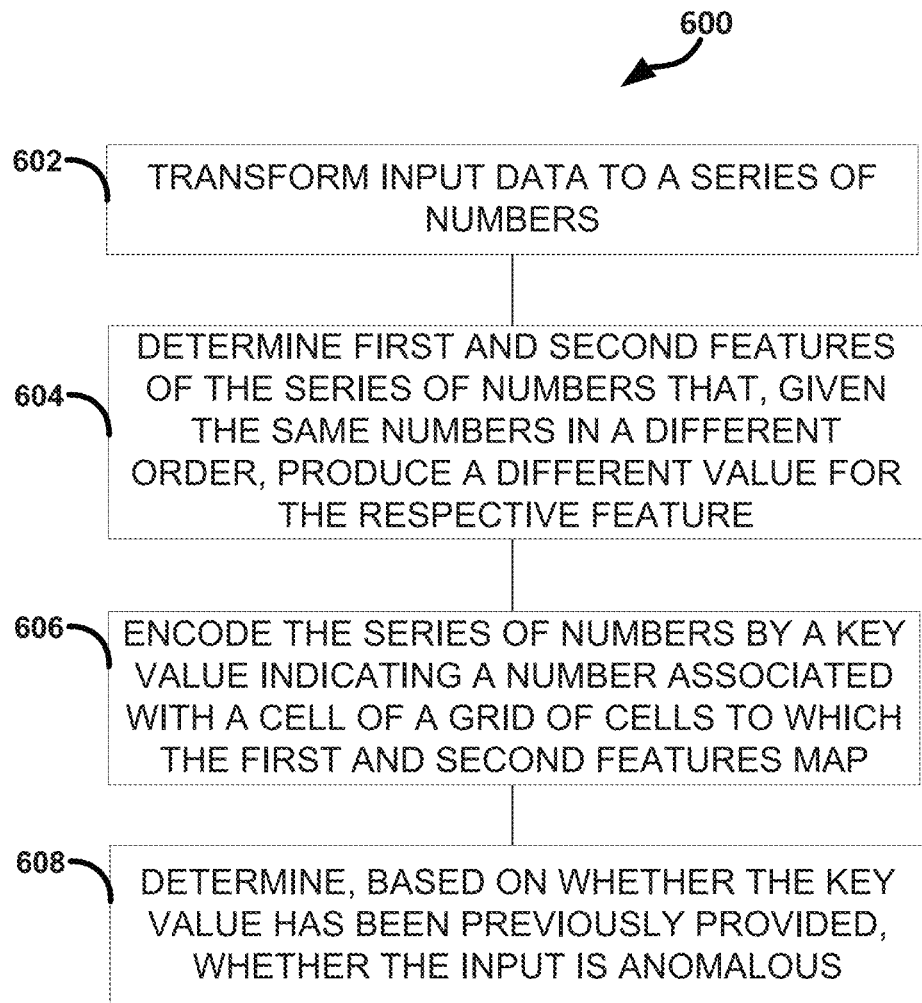
FIG. 6 illustrates, by way of example, a diagram of an embodiment of a method for identifying an anomalous behavior.

FIG. 6 illustrates, by way of example, a diagram of an embodiment of a method 600 for identifying anomalous behavior. The method 600 as illustrated includes transforming input data to a series of numbers, at operation 602, determining respective first and second features of the series of numbers that, given the same numbers in a different order, produce a different value for the respective feature, at operation 604; encoding the series of numbers by a key value indicating a number associated with a cell of the grid of cells to which the first and second features map, at operation 606; and determining, based on whether the key value has been previously provided by the processing circuitry, whether the input is anomalous, at operation 608. The operation 608 can include determining that the key value is anomalous if (a) the key value has not been previously provided by the processing circuitry or (b) the key value has been previously provided by the processing circuitry and the first and second features are a threshold distance from a central value associated with the cell.

The method 600 can further include, wherein the first feature includes one of an R-type feature, an S-type feature, a T-type feature, an OC-type feature and an OCR-type feature. The method 600 can further include, wherein the first feature is determined based on length of the input data. The method 600 can further include, wherein the second feature includes one of the R-type feature, the 5-type feature, the T-type feature, the OC-type feature and the OCR-type feature. The method 600 can further include, wherein the first and second features are different features of the same input data. The method 600 can further include, wherein the first and second features are the same features of different, overlapping input data.

The method 600 can further include, wherein the processing circuitry is further configured to segregate cells of the grid into groups based on cells to which the first and second features map. The method 600 can further include, wherein segregating cells of the grid into groups includes identifying one or more rows and one or more columns of the grid of cells that include at least one input mapped thereto, and aggregating contiguous cells corresponding to both a row of the identified one or more rows and a column of the identified one or more columns into a corresponding group of cells. The method 600 can further include wherein, segregating cells into the corresponding group further comprises for each corresponding group of cells, further identifying one or more rows and one or more columns of the group of cells that include at least one input mapped thereto, and aggregating contiguous cells corresponding to both a row of the further identified rows and a column of the further identified columns into a corresponding group of cells.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA), graphics processing unit (GPU), or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The transformation of encoded data into a 2D representation forms an "image" of SV grid data. This image may be operated on using conventional image processing techniques including convolution operators, foreground background segmentation, edge detection, texture characterization, morphological image operators, and image algebra including affine transformations and projections, among others. The image format also enables optical processing and optical computer techniques to be applied enabling spatial matched filtering, holography, Fourier, Gabor, and wavelet transformation, optical neural network connectionist architecture representation, complementary metal oxide semiconductor (CMOS) focal plane array integrated monolithic hybrid meta-material structures (including but not limited to non-linear optically active crystals and nano-structures) to be used for encoding and reading out SV patterns as well as transforming and partitioning the data thereby represented using purely optical and meta-material embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, such as in a machine-readable medium for execution by, or to control the operation of, data processing apparatus, such as a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., an FPGA, GPU, ASIC, or optical computer or hybrid meta-material element.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 7:
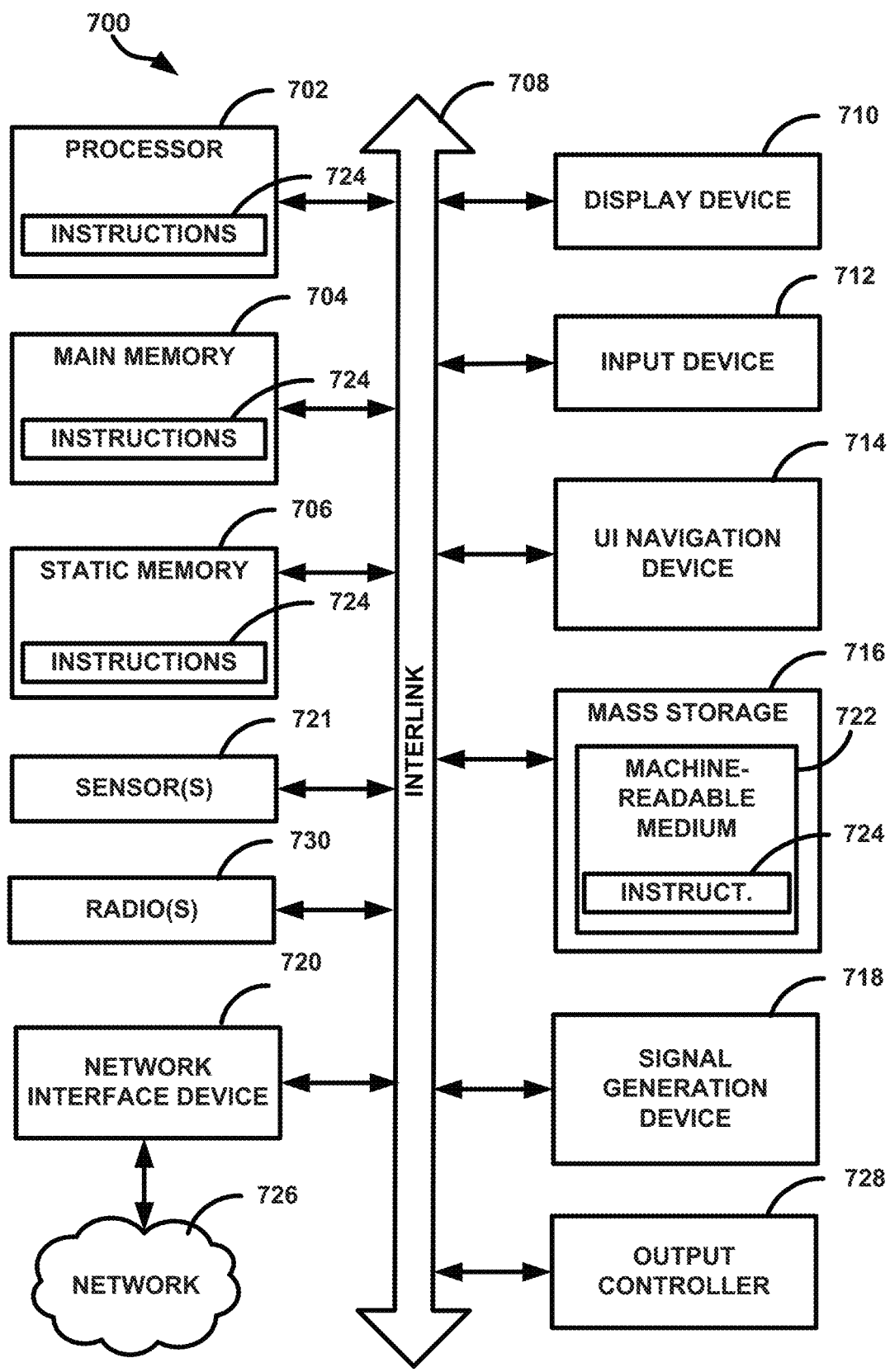
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UT) navigation device 714 (e.g., a mouse), a disk drive unit 716, a signal generation device 718 (e.g., a speaker), a network interface device 720, and radios 730 such as Bluetooth, WWAN, WLAN, and NFC, permitting the application of security controls on such protocols.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks or hybrid meta-materials.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLE EMBODIMENTS

Example 1 includes an apparatus comprising a memory including data indicating a grid size and a number of cells in a grid of cells, processing circuitry coupled to the memory, the processing circuitry being configured to transform input data to a series of numbers, determine first features and second features of the series of numbers that, given the same numbers in a different order, produce a different value for the respective feature, and encode the series of numbers by a key value indicating a number associated with a cell of the grid of cells to which the first and second features map, and classifier circuitry coupled to the memory, the classifier circuitry being configured to determine, based on whether the key value has been previously provided by the processing circuitry, whether the input is anomalous.

In Example 2, Example 1 further includes, wherein the first feature includes one of an R-type feature, an S-type feature, a T-type feature, an OC-type feature and an OCR-type feature.

In Example 3, at least one of Examples 1-2 further includes, wherein the first feature is determined based on length of the input data.

In Example 4, at least one of Examples 2-3 further includes, wherein the second feature includes one of the R-type feature, the S-type feature, the T-type feature, the OC-type feature and the OCR-type feature.

In Example 5, Example 4 further includes, wherein the first and second features are different features of the same input data.

In Example 6, Example 4 further includes, wherein the first and second features are the same features of different, overlapping input data.

In Example 7, at least one of Examples 1-6 further includes, wherein the processing circuitry is further configured to segregate cells of the grid into groups based on cells to which the first and second features map.

In Example 8, Example 7 further includes identifying one or more rows and one or more columns of the grid of cells that include at least one input mapped thereto, and aggregating contiguous cells corresponding to both a row of the identified one or more rows and a column of the identified one or more columns into a corresponding group of cells.

In Example 9, Example 8 further includes for each corresponding group of cells, further identifying one or more rows and one or more columns of the group of cells that include at least one input mapped thereto, and aggregating contiguous cells corresponding to both a row of the further identified rows and a column of the further identified columns into a corresponding group of cells.

In Example 10, at least one of Examples 1-9 further includes, wherein the classifier circuitry is further configured to determine that the key value is anomalous if (a) the key value has not been previously provided by the processing circuitry or (b) the key value has been previously provided by the processing circuitry and the first and second features are a threshold distance from a central value associated with the cell.

Example 11 includes at least one non-transitory machine-readable medium including instructions that, when executed by a machine, cause the machine to perform operations for identifying anomalous behavior, the operations comprising transforming input data to a series of numbers, determining first features and second features of the series of numbers that, given the same numbers in a different order, produce a different value for the respective feature, encoding the series of numbers by a key value indicating a number associated with a cell of a grid of cells to which the first and second features map, and determining, based on whether the key value has been previously provided, whether the input is anomalous.

In Example 12, Example 11 further includes, wherein the first feature includes one of an R-type feature, an S-type feature, a T-type feature, an OC-type feature and an OCR-type feature.

In Example 13, at least one of Examples 11-12 further includes, wherein the first feature is determined based on length of the input data.

In Example 14, at least one of Examples 12-13 further includes, wherein the second feature includes one of the R-type feature, the S-type feature, the T-type feature, the OC-type feature and the OCR-type feature.

In Example 15, Example 14 further includes, wherein the first and second features are different features of the same input data.

In Example 16, at least one of Examples 14-15 further includes, wherein the first and second features are the same features of different, overlapping input data.

In Example 17, at least one of Examples 11-16 further includes segregating cells of the grid into groups based on cells to which the first and second features map.

In Example 18, Example 17 further includes, wherein segregating cells of the grid into groups includes identifying one or more rows and one or more columns of the grid of cells that include at least one input mapped thereto, and aggregating contiguous cells corresponding to both a row of the identified one or more rows and a column of the identified one or more columns into a corresponding group of cells.

In Example 19, Example 18 further includes, wherein segregating cells into the corresponding group further comprises for each corresponding group of cells, further identifying one or more rows and one or more columns of the group of cells that include at least one input mapped thereto, and aggregating contiguous cells corresponding to both a row of the further identified rows and a column of the further identified columns into a corresponding group of cells.

In Example 20, at least one of Examples 11-19 can further include, wherein the classifier circuitry is further configured to determine that the key value is anomalous if (a) the key value has not been previously provided by the processing circuitry or (b) the key value has been previously provided by the processing circuitry and the first and second features are a threshold distance from a central value associated with the cell.

Example 21 includes a method of identifying anomalous behavior, the method comprising transforming input data to a series of numbers, determining first features and second features of the series of numbers that, given the same numbers in a different order, produce a different value for the respective feature, encoding the series of numbers by a key value indicating a number associated with a cell of a grid of cells to which the first and second features map, and determining, based on whether the key value has been previously provided, whether the input is anomalous.

In Example 22, Example 21 further includes segregating cells of the grid into groups based on cells to which the first and second features map.

In Example 23, Example 22 further includes segregating cells of the grid into groups includes identifying one or more rows and one or more columns of the grid of cells that include at least one input mapped thereto, and aggregating contiguous cells corresponding to both a row of the identified one or more rows and a column of the identified one or more columns into a corresponding group of cells.

In Example 24, at least one of Examples 18-23 further includes, wherein segregating cells into the corresponding group further comprises for each corresponding group of cells, further identifying one or more rows and one or more columns of the group of cells that include at least one input mapped thereto, and aggregating contiguous cells corresponding to both a row of the further identified rows and a column of the further identified columns into a corresponding group of cells.

In Example 25, at least one of Examples 21-24 further includes, determining that the key value is anomalous if (a) the key value has not been previously provided by the processing circuitry or (b) the key value has been previously provided by the processing circuitry and the first and second features are a threshold distance from a central value associated with the cell.

In Example 26, at least one of Examples 21-25 further includes, wherein the first feature includes one of an R-type feature, an S-type feature, a T-type feature, an OC-type feature and an OCR-type feature.

In Example 27, at least one of Examples 21-26 further includes, wherein the first feature is determined based on length of the input data.

In Example 28, at least one of Examples 22-27 further include, wherein the second feature includes one of the R-type feature, the S-type feature, the T-type feature, the OC-type feature and the OCR-type feature.

In Example 29, Example 28 further includes, wherein the first and second features are different features of the same input data.

In Example 30, Example 28 further includes, wherein the first and second features are the same features of different, overlapping input data.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus comprising:
a memory including data indicating a grid size and a number of cells in a grid of cells, the grid of cells including first feature values of first features along an x-axis of the grid of cells and second feature values of second features along a y-axis of the grid of cells;
processing circuitry coupled to the memory, the processing circuitry being configured to:
transform input data to a series of numbers;
determine the first features and the second features of the series of numbers that, given the same numbers in a different order, produce a different value for the respective feature; and
encode the series of numbers by a key value indicating a number associated with a cell of the grid of cells to which the first and second features map; and
classifier circuitry coupled to the memory, the classifier circuitry being configured to determine, based on whether the key value has been previously provided by the processing circuitry, whether the input is anomalous.

2. The apparatus of claim 1, wherein the first feature includes one of an R-type feature, an S-type feature, a T-type feature, an OC-type feature and an OCR-type feature.

3. The apparatus of claim 2, wherein the second feature includes one of the R-type feature, the S-type feature, the T-type feature, the OC-type feature and the OCR-type feature.

4. The apparatus of claim 3, wherein the first and second features are different features of the same input data.

5. The apparatus of claim 3, wherein the first and second features are the same features of different, overlapping input data.

6. The apparatus of claim 1, wherein the first feature is determined based on a number of characters of the input data.

7. The apparatus of claim 1, wherein the processing circuitry is further configured to segregate cells of the grid into groups based on cells to which the first and second features map.

8. The apparatus of claim 7, wherein segregating cells of the grid into groups includes:
identifying one or more rows and one or more columns of the grid of cells that include at least one input mapped thereto; and
aggregating contiguous cells corresponding to both a row of the identified one or more rows and a column of the identified one or more columns into a corresponding group of cells.

9. The apparatus of claim 8, wherein segregating cells into the corresponding group further comprises:
for each corresponding group of cells, further identifying one or more rows and one or more columns of the group of cells that include at least one input mapped thereto; and
aggregating contiguous cells corresponding to both a row of the further identified rows and a column of the further identified columns into a corresponding group of cells.

10. The apparatus of claim 1, wherein the classifier circuitry is further configured to determine that the key value is anomalous if (a) the key value has not been previously provided by the processing circuitry or (b) the key value has been previously provided by the processing circuitry and the first and second features are a threshold distance from a central value associated with the cell.

11. At least one non-transitory machine-readable medium including instructions that, when executed by a machine, cause the machine to perform operations comprising:
transforming input data to a series of numbers;
determining first features and second features of the series of numbers that, given the same numbers in a different order, produce a different value for the respective feature;
encoding the series of numbers by a key value indicating a number associated with a cell of a grid of cells to which the first and second features map the grid of cells including first feature values of the first features along an x-axis of the grid of cells and second feature values of the second features along a y-axis of the grid of cells; and
determining, based on whether the key value has been previously provided, whether the input is anomalous.

12. The at least one non-transitory machine-readable medium of claim 11, wherein the first feature includes one of an R-type feature, an S-type feature, a T-type feature, an OC-type feature and an OCR-type feature.

13. The at least one non-transitory machine-readable medium of claim 12, wherein the second feature includes one of the R-type feature, the S-type feature, the T-type feature, the OC-type feature and the OCR-type feature.

14. The at least one non-transitory machine-readable medium of claim 13, wherein the first and second features are different features of the same input data.

15. The at least one non-transitory machine-readable medium of claim 11, wherein the first feature is determined based on a number of characters of the input data.

16. A method of identifying anomalous behavior, the method comprising:
transforming input data to a series of numbers;
determining first features and second features of the series of numbers that, given the same numbers in a different order, produce a different value for the respective feature;
encoding the series of numbers by a key value indicating a number associated with a cell of a grid of cells to which the first and second features map, the grid of cells including first feature values of the first features along an x-axis of the grid of cells and second feature values of the second features along a y-axis of the grid of cells; and
determining, based on whether the key value has been previously provided, whether the input is anomalous.

17. The method of claim 16, further comprising segregating cells of the grid into groups based on cells to which the first and second features map.

18. The method of claim 17, wherein segregating cells of the grid into groups includes:

identifying one or more rows and one or more columns of the grid of cells that include at least one input mapped thereto; and aggregating contiguous cells corresponding to both a row of the identified one or more rows and a column of the identified one or more columns into a corresponding group of cells.

19. The method of claim 18, wherein segregating cells into the corresponding group further comprises:

for each corresponding group of cells, further identifying one or more rows and one or more columns of the group of cells that include at least one input mapped thereto; and aggregating contiguous cells corresponding to both a row of the further identified rows and a column of the further identified columns into a corresponding group of cells.

20. The method of claim 16, determining that the key value is anomalous if (a) the key value has not been previously provided by the processing circuitry or (b) the key value has been previously provided by the processing circuitry and the first and second features are a threshold distance from a central value associated with the cell.

* * * * *